(12) United States Patent
Venkataramani et al.

(10) Patent No.: US 7,900,437 B2
(45) Date of Patent: Mar. 8, 2011

(54) HEAT TRANSFER SYSTEM AND METHOD FOR TURBINE ENGINE USING HEAT PIPES

(75) Inventors: Kattalaicheri Srinivasan Venkataramani, West Chester, OH (US); Thomas Ory Moniz, Loveland, OH (US); Justin P. Stephenson, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1520 days.

(21) Appl. No.: 11/460,791

(22) Filed: Jul. 28, 2006

(65) Prior Publication Data
US 2010/0236217 A1 Sep. 23, 2010

(51) Int. Cl.
*B64D 15/00* (2006.01)
*F02K 99/00* (2009.01)
*F02G 3/00* (2006.01)
*F02C 7/00* (2006.01)

(52) U.S. Cl. ........ 60/267; 60/39.093; 60/779; 244/134 R

(58) Field of Classification Search ............... 60/39.093, 60/779, 39.83, 39.08; 244/134 R, 134 B; 165/104.26; 415/176, 178, 114, 108
See application file for complete search history.

(56) References Cited

U.S. PATENT DOCUMENTS

| | | | |
|---|---|---|---|
| 3,965,681 A | 6/1976 | Wyczalek et al. | |
| 4,186,559 A | 2/1980 | Decker et al. | |
| 4,199,300 A | 4/1980 | Tubbs | |
| 4,207,027 A | 6/1980 | Barry et al. | |
| 4,218,179 A | 8/1980 | Barry et al. | |
| 4,240,257 A | 12/1980 | Rakowsky et al. | |
| 4,419,044 A | 12/1983 | Barry et al. | |
| 4,671,348 A * | 6/1987 | Bauer | 165/41 |
| 4,921,041 A * | 5/1990 | Akachi | 165/104.29 |
| 5,046,920 A | 9/1991 | Higashi et al. | |
| 5,178,514 A | 1/1993 | Damiral | |
| 5,192,186 A | 3/1993 | Sadler | |
| 5,439,351 A | 8/1995 | Artt | |
| 5,878,808 A | 3/1999 | Rock et al. | |
| 5,964,279 A | 10/1999 | Mochizuki et al. | |
| 5,975,841 A | 11/1999 | Lindemuth et al. | |
| 5,979,220 A | 11/1999 | Zombo et al. | |
| 6,308,524 B1 | 10/2001 | Mochizuki et al. | |
| 6,990,797 B2 | 1/2006 | Venkataramani et al. | |
| 7,131,612 B2 * | 11/2006 | Baptist et al. | 244/134 R |
| 2002/0174540 A1 * | 11/2002 | Milburn | 29/889.7 |
| 2005/0050877 A1 * | 3/2005 | Venkataramani et al. | 60/39.093 |

FOREIGN PATENT DOCUMENTS

| | | | |
|---|---|---|---|
| GB | 2047811 | * | 7/1979 |
| GB | 2136880 A | | 9/1984 |

* cited by examiner

*Primary Examiner* — William H Rodriguez
*Assistant Examiner* — Gerald L Sung
(74) *Attorney, Agent, or Firm* — Adams Intellectual Property Law; David L. Narciso, Esq.

(57) ABSTRACT

A heat transfer system is provided for a turbine engine of the type including an annular casing with an array of thermally conductive, generally radially-extending strut members disposed therein. The heat transfer system includes at least one arcuate heat pipe disposed in contact with an outer surface of the casing within fore-and-aft limits of the axial extent of the strut members. The heat pipe is thermally coupled to a heat source, such that heat from the heat source can be transferred through the heat pipe and the casing to the strut members.

24 Claims, 4 Drawing Sheets

HEAT TRANSFER SYSTEM AND METHOD FOR TURBINE ENGINE USING HEAT PIPES

BACKGROUND OF THE INVENTION

This invention relates generally to turbine engines, and more particularly to a system and method using heat pipes for transferring heat within a gas turbine engine.

Gas turbine engines use pressurized oil to lubricate and cool various components (e.g. bearings, etc.). The oil picks up significant heat in the process which must be rejected to maintain the oil temperature within acceptable limits. Prior art gas turbine engines often employ heat exchangers to cool the engine oil using a relatively cool air stream such as fan discharge air. In turbofan engines, this heat exchanger is often located in the fan duct flow path. This configuration results in a pressure loss and hence a significant fuel burn penalty. It has been estimated that the specific fuel consumption (SFC) penalty associated with this type of configuration can be as high as 1%. There are also cost and weight penalties associated with this configuration.

In addition, in some engines, outlet guide vanes (OGVs), fan struts, or other strut-like members in the fan duct downstream of the fan accrete ice under certain environmental conditions. Ice accumulation within the engine and over exposed engine structures may be significant. The accreted ice may lead to partial blocking of the OGV passages and fan instability. The accumulated ice can also be suddenly shed, for example through continued operation of the engine, a throttle burst from lower power operation to higher power operation, or vibrations due to either turbulence or asymmetry of ice accretion.

Various prior art methods exist for anti-icing, for example, running the engine with an increased operating temperature, directing high temperature bleed air from the engine compressor to the exposed surfaces, spraying the engine with a deicing solution prior to operation, and electric resistance heating. However, all of these methods have various disadvantages. The increased operating temperature and the bleed systems may decrease engine performance. Such systems may also require valves to turn off the flow of the high temperature air during take-off and other high power operations to protect the engine. Deicing fluid provides protection for only a limited time. Electrical heating requires large quantities of electricity for performing the de-icing operation and may require additional electrical generators, electrical circuits and complex interaction logic with the airplane's computers with the attendant increased cost, weight and performance penalties.

BRIEF SUMMARY OF THE INVENTION

The above-mentioned shortcomings in the prior art among others are addressed by the present invention, which provides a heat transfer system that removes waste heat from the engine lubrication oil and transfers that heat to engine components that require heating, for example for anti-icing or de-icing purposes. This heat is transferred using heat pipes which are lightweight, sealed, and passive, requiring no valves or pumps. Furthermore, the heat pipes may use a working fluid which is non-flammable to avoid creating a fire hazard within the engine.

According to one aspect, the invention provides a heat transfer system for a turbine engine of the type including an annular casing with an array of thermally conductive, generally radially-extending strut members disposed therein. The heat transfer system includes at least one arcuate heat pipe disposed in contact with an outer surface of the casing and thermally coupled to a heat source, such that heat from the heat source can be transferred through the heat pipe and the casing to the strut members.

According to another aspect of the invention, a gas turbine engine includes an annular fan casing; an array of generally radially-extending guide vanes disposed therein, each guide vane having an airfoil cross-section defined by first and second sides extending between spaced-apart leading and trailing edges; a plurality of arcuate heat pipes, at least a portion of each heat pipe being disposed against an outer surface of the fan casing within fore-and-aft limits of the axial extent of the guide vanes; and a heat source thermally coupled to the heat pipes such that heat from the heat source can be transferred through the heat pipes and the fan casing to the guide vanes.

According to another aspect of the invention, a method is provided for transferring heat in a turbine engine having an annular casing with an array of generally radially-extending guide vanes disposed therein. The method includes the steps of: providing a plurality of arcuate heat pipes, at least a portion of each heat pipe being disposed against an exterior surface of the casing and within fore-and-aft limits of the axial extent of the guide vanes; thermally coupling the heat pipes to a heat source; and receiving heat from the heat source in the heat pipes and transferring the heat to the guide vanes through the casing.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
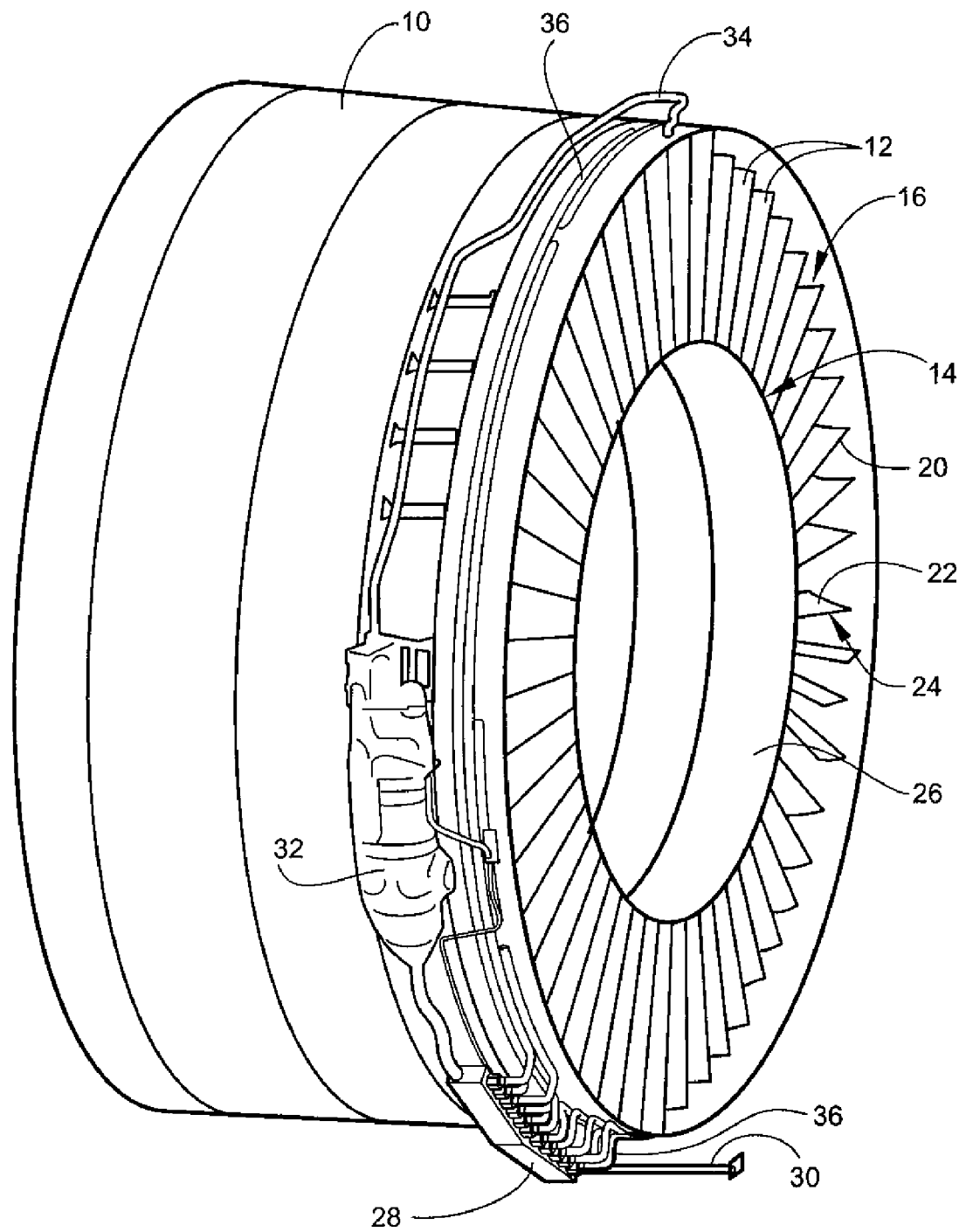
FIG. 1 is a perspective view of a portion of the fan module (aft looking forward) of a gas turbine engine including a heat transfer system constructed in accordance with an aspect of the present invention.
Figure 2:
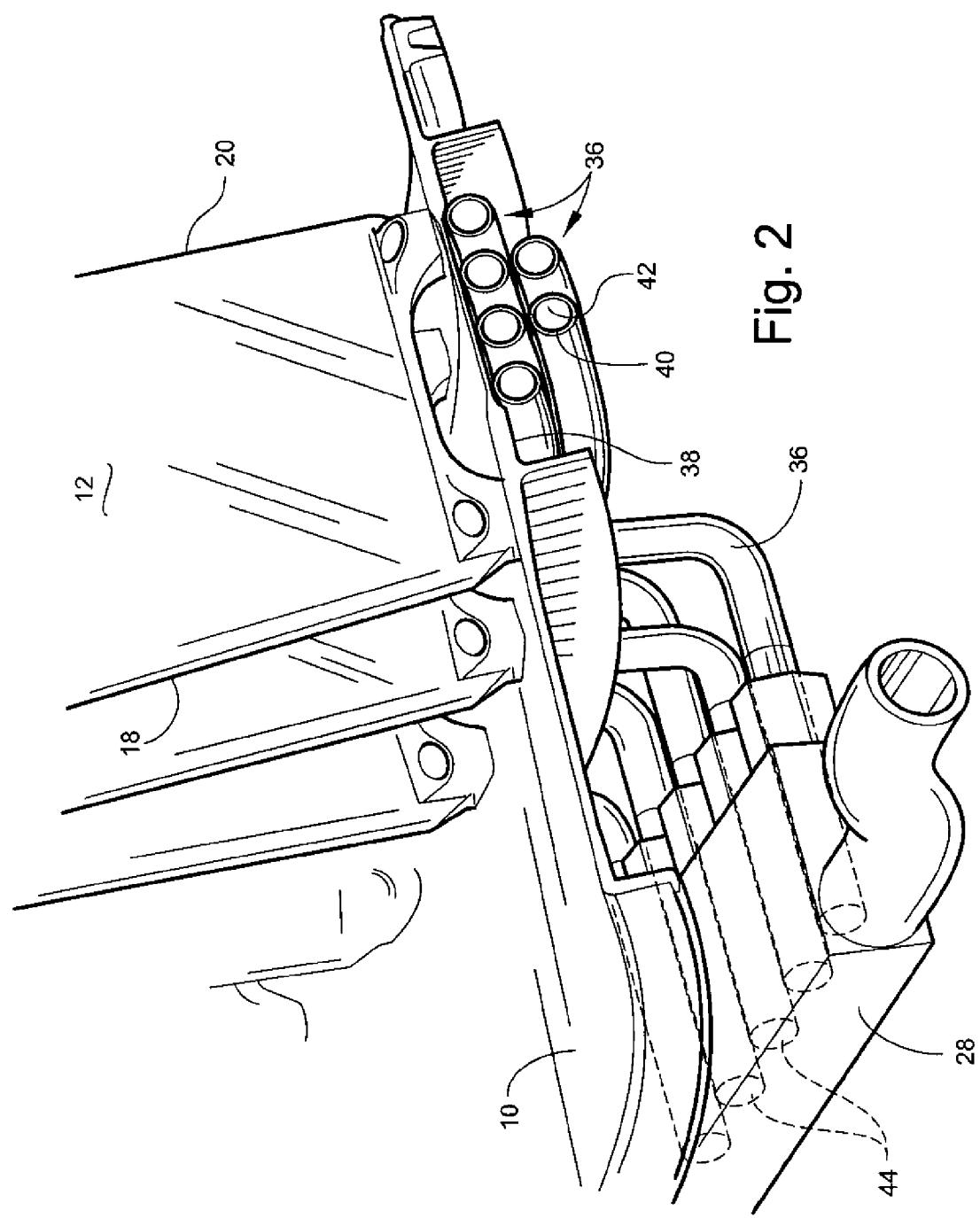
FIG. 2 is an enlarged cut-away view of a portion of the fan module of FIG. 1.
Figure 3:
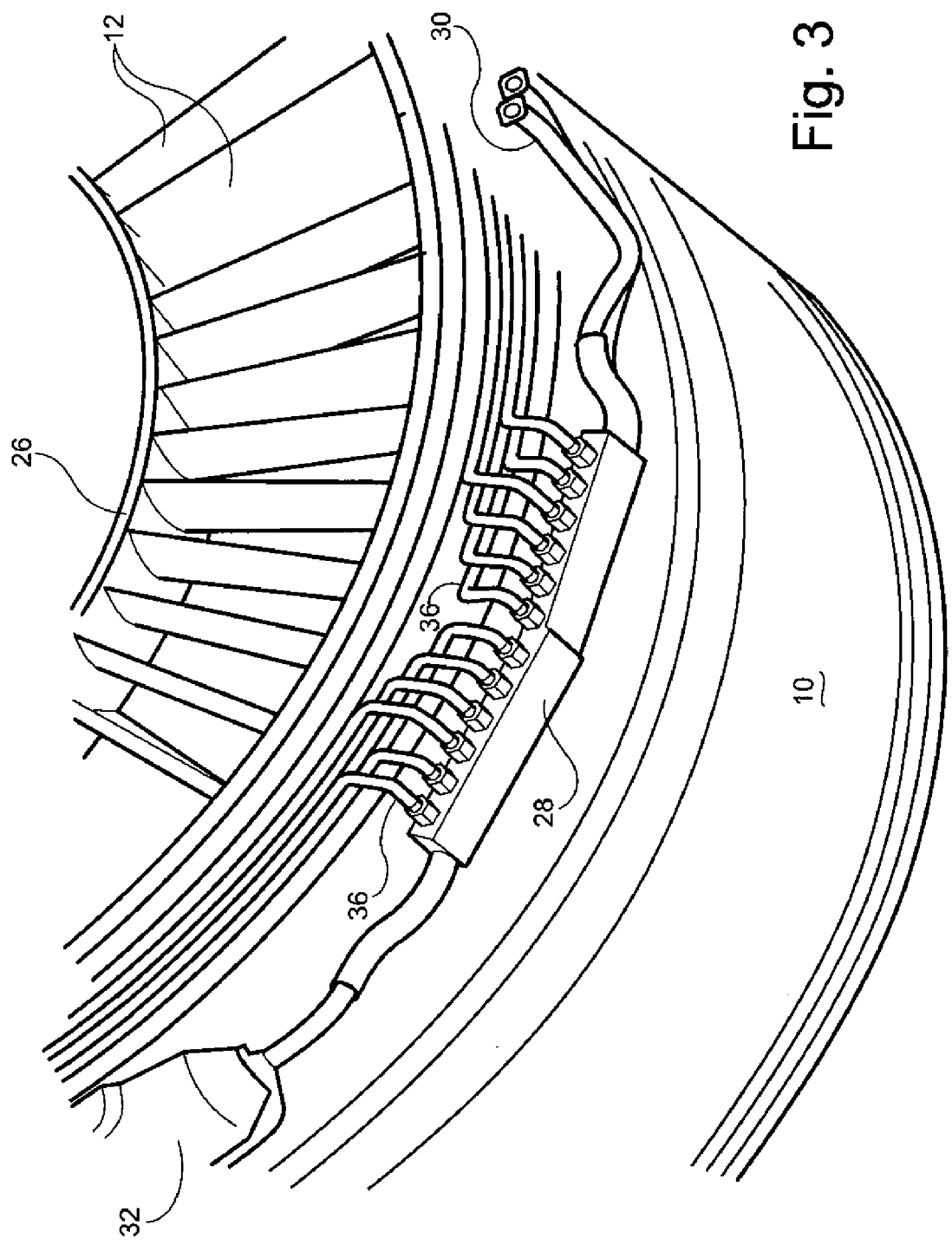
FIG. 3 is an enlarged perspective view of a heat exchanger mounted to the fan module of FIG. 1.

Referring to the drawings wherein identical reference numerals denote the same elements throughout the various views, FIGS. 1-3 illustrate a portion of a fan module of a gas turbine engine, including an annular fan casing 10. A plurality of outlet guide vanes (OGVs) 12 are connected to and disposed within the fan casing 10. Each of the OGVs 12 (also shown in FIG. 2) has a root 14, a tip 16, a leading edge 18, a trailing edge 20, and opposed sides 22 and 24. The OGVs 12 are airfoil-shaped and are positioned and oriented to remove a tangential swirl component from the air flow exiting an upstream fan (not shown). In the illustrated example, the OGVs also serve as structural members (sometimes referred to as "fan struts") which connect the fan casing to an inner housing 26. However, in other engine configurations, these functions may be served by separate components. The heat transfer system described herein is equally applicable to OGVs, fan struts, and all other types of generally radially-extending "strut members".

The OGVs 12 may be constructed from any material which has adequate strength to withstand the expected operating loads and which can be formed in the desired shape. To enhance heat transfer, it is preferred that the OGVs be thermally conductive. Examples of suitable materials are metallic alloys, such as aluminum-, iron-, nickel- or titanium-based alloys.

A heat exchanger 28 is mounted on the outside of the fan casing 10. The heat exchanger 28 may simply be a housing with an open interior. In the illustrated example, oil from the engine's lubrication system enters the heat exchanger 28 through a scavenge line 30. After exiting the heat exchanger 28, it passes into a storage tank 32 until needed, at which time it flows back to the engine's lubrication system through supply line 34. The remainder of the oil storage, circulation, and distribution system connected to the scavenge and supply lines 30 and 34 is conventional within the gas turbine engine art, and not discussed here. If desired, the heat exchanger 28 could be connected to another type of heat source, such as a bleed air line, an electric source, or another fluid system within the engine.

A plurality of heat pipes 36 are disposed around the exterior of the fan casing 10, in contact with its outer surface 38, and positioned within forward and aft limits defined by the axial extent of the OGVs 12. While shown as circular in FIG. 2, the portion of the heat pipes 36 that lie against the fan casing 10 may be formed into oval, flattened, or other non-circular cross-sectional shapes to accommodate a desired cross-sectional area while improving volumetric packaging or heat transfer.

Each heat pipe 36 has an elongated outer wall 40 with closed ends which defines a cavity 42. The cavity 42 is lined with a capillary structure or wick (not shown) and holds a working fluid. Various working fluids, such as gases, water, organic substances, and low-melting point metals are known for use in heat pipes. The working fluid may be non-flammable so as to avoid introducing a fire hazard into the area of the fan casing 10 in the event of a leak or break in the heat pipe 36.

One end of each heat pipe 36 is disposed inside the heat exchanger 28. This portion is designated as a "hot" or "evaporator" end 44.

The heat pipes 36 are highly efficient at transferring heat. For example, their effective thermal conductivity is several orders of magnitude higher than that of solid copper. The number, length, diameter, shape, working fluid, and other performance parameters of the heat pipes are selected based on the desired degree of heat transfer during engine operation. The operation of the heat pipes 36 are described in more detail below.

Figure 4:
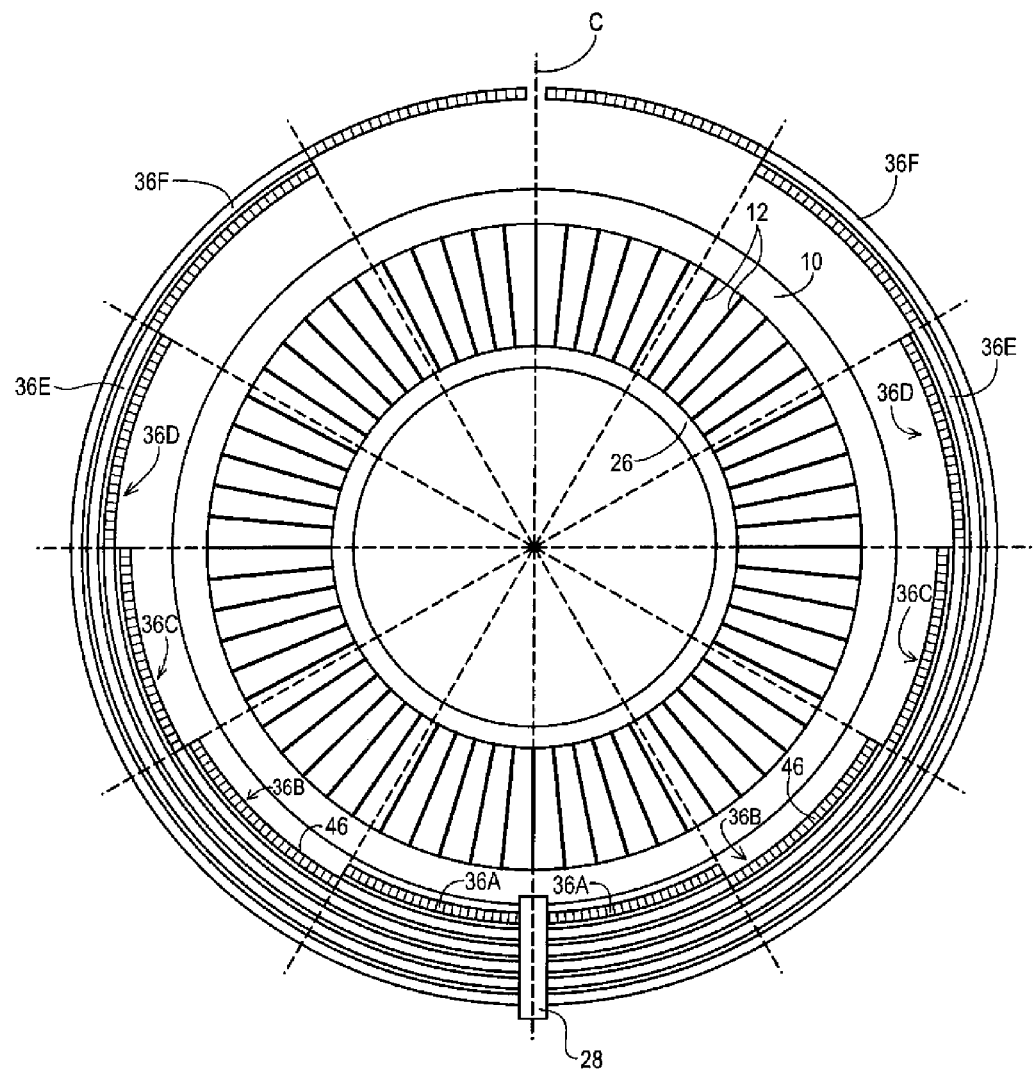
FIG. 4 is a schematic diagram illustrating a configuration of heat pipes disposed around the periphery of the fan module of FIG. 1.

FIG. 4 illustrates schematically an example of how the heat pipes 36 may be arranged to provide heat transfer to the periphery of the fan casing 10. It is noted that in FIG. 4, the heat pipes 36 are depicted as being radially spaced-apart or "stacked". This is merely for the purposes of clear illustration of how the heat pipes 36 extend around the fan casing 10. FIG. 4 is not necessarily representative of the actual physical installation of the heat pipes 36, which is shown in FIGS. 1-3. On each side of a vertical centerline, an arcuate first beat pipe 36A is connected to the heat exchanger 28 and extends approximately 30° around the fan casing 10. The entire extent of each of the first heat pipes 36A is uninsulated, as depicted by the hatching pattern in the figure.

On each side of the vertical centerline "C", an arcuate second heat pipe 36B is connected to the heat exchanger 28 and extends approximately 60° around the fan casing 10. The first 30° of span of each of the second heat pipes 36B is covered with an appropriate type of thermal insulation (not shown) to minimize heat transfer. The distal end segment (approximately 30° of span) of each of the second heat pipes 36B is uninsulated, as depicted by the hatching pattern in the drawing. This uninsulated portion of the heat pipe 36 is designated as a "cold" or "condenser" end 46. It should be noted that terms "hot", "evaporator", "cold", and "condenser", when used in relation to the heat pipes 36, describe the positioning of the heat pipes 36 in areas of relatively high or low temperature, and are not related to any particular aspect of the structure of the heat pipes 36 themselves.

This pattern is continued using pairs of arcuate third heat pipes 36C, fourth heat pipes 36D, fifth heat pipes 36E, and sixth heat pipes 36F. Each pair of heat pipes 36 extends approximately 30° farther than the previous pair, and the distal end segment (approximately 30° of span) of each pair of heat pipes 36 is uninsulated. The heat pipes 36 are insulated in this manner so that heat can be transferred a substantial distance around the periphery of the fan casing 10. The pattern of uninsulated segments provides substantially 360° coverage of the fan casing. It is noted that FIG. 4 is merely schematic, and that in actual practice the uninsulated portion of each heat pipe 36 would be placed in direct contact with the fan casing 10. In other words, any given portion of the circumferential extent of the fan casing 10 is in direct contact with essentially no more than one of the uninsulated segments of the heat pipes 36.

The number of heat pipes 36, the circumferential extent of each heat pipe 36, and the percentage of each heat pipe 36 which is uninsulated may be varied to suit a particular application. For example, a smaller number of heat pipes 36 each with a larger uninsulated segment could be used, or a larger number of heat pipes each with a smaller uninsulated segment could also be used.

Additional thermal insulation, which is not illustrated for clarity, may be provided within the heat transfer system wherever it is desired to prevent heat loss. For example, insulation may be placed around the exterior of the heat exchanger 28.

In operation, oil which has absorbed heat from various parts of the engine is circulated into the heat exchanger 28 where it heats the hot or evaporator ends 44 of the heat pipes 36. The heat removal cools the oil to an acceptable working temperature so that it can be passed into the storage tank 32 and subsequently re-circulated through the engine. The working fluid within the heat pipes 36 absorbs that heat and evaporates. The vapor generated then travels through the cavities 42, and condenses at the cold portions 46 of the heat pipes 36, thereby transferring heat to the cold portions 46. A wick or other capillary structure that extends from one end of the heat pipe 36 to the other transports the condensed liquid back to the hot portion 44 by capillary action, thereby completing the circuit. The heat transfer to the OGVs 12 is effective for preventing ice formation (i.e. anti-icing) and/or removing ice which has formed on the OGVs 12 (i.e. de-icing), depending on the heating rate.

The heat transfer system described herein, being passive, needs no valves and is sealed. The number, size, and location of the heat pipes 36 can be selected to provide heat removal and transfer as needed. Depending upon the exact configuration chosen, the system performance may be used only for anti-icing or de-icing, or for only for oil cooling, or for both purposes. The heat transfer system makes use of heat which is undesired in one portion of an engine and uses that heat where it is needed in another portion of the engine, avoiding both the losses associated with prior art cooling systems and the need for a separate anti-icing heat source.

While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A heat transfer system for a turbine engine including an annular casing with an array of generally radially-extending strut members disposed therein, the heat transfer system comprising:
   a plurality of arcuate heat pipes each having an uninsulated circumferential segment disposed in thermal contact with a respective circumferential portion of an outer surface of the casing and each thermally coupled to a heat source, such that heat from the heat source can be transferred through the heat pipes and the casing to the strut members, and wherein each circumferential portion of the outer surface of the casing is disposed in thermal contact with only one of the uninsulated circumferential segments and the uninsulated circumferential segments do not overlap circumferentially, and wherein each of the arcuate heat pipes in a same circumferential direction around the casing from the heat source has a different length.

2. The heat transfer system of claim 1 wherein the heat pipes are disposed within fore-and-aft limits of the axial extent of the strut members.

3. The heat transfer system of claim 1 wherein each strut member is a guide vane having an airfoil cross-section defined by first and second sides extending between spaced-apart leading and trailing edges.

4. The heat transfer system of claim 1 wherein at least an end portion of each heat pipe is disposed inside a hollow interior of a heat exchanger adapted to receive a flow of heated fluid therethrough.

5. The heat transfer system of claim 1 wherein each heat pipe has a first end thermally coupled to the heat source, and a second end defined by the uninsulated circumferential segment thereof.

6. The heat transfer system of claim 5, wherein at least one heat pipe includes
   an insulated portion disposed between the first end and the uninsulated circumferential segment.

7. The heat transfer system of claim 1 wherein the selected strut member comprises a metal.

8. The heat transfer system of claim 1 in which the strut members are constructed of an alloy of aluminum, iron, nickel, or titanium.

9. The heat transfer system of claim 1 wherein each heat pipe includes an elongated outer wall with closed ends defining a cavity that contains a working fluid.

10. The heat transfer system of claim 1 wherein the heat transfer system facilitates at least one of preventing ice formation on the strut members and removing ice which has formed on the strut members.

11. The heat transfer system of claim 1 wherein the heat source is engine oil from the turbine engine, and the heat transfer system facilitates maintaining the engine oil at an acceptable working temperature.

12. A gas turbine engine including:
   an annular fan casing;
   an array of generally radially-extending guide vanes disposed therein, each guide vane having an airfoil cross-section defined by first and second sides extending between spaced-apart leading and trailing edges;
   a plurality of arcuate heat pipes each having an uninsulated circumferential segment disposed in thermal contact with a respective circumferential portion of an outer surface of the fan casing within fore-and-aft limits of the axial extent of the guide vanes; and
   a heat source thermally coupled to the heat pipes such that heat from the heat source can be transferred through the heat pipes through the fan casing and to the guide vanes,
   wherein each circumferential portion of the outer surface of the fan casing is disposed in thermal contact with only one of the uninsulated circumferential segments such that the uninsulated circumferential segments do not overlap circumferentially, and wherein each of the arcuate heat pipes in a same circumferential direction around the casing from the heat source has a different length.

13. The heat transfer system of claim 12 wherein at least one portion of each heat pipe is disposed inside a hollow interior of a heat exchanger adapted to receive a flow of heated fluid therethrough.

14. The heat transfer system of claim 12 wherein each heat pipe has a first end thermally coupled to the heat source, and a second end defined by the uninsulated circumferential segment thereof.

15. The heat transfer system of claim 14 wherein at least one heat pipe includes
   an insulated portion disposed between the first end and the uninsulated circumferential segment.

16. The heat transfer system of claim 12 wherein at least one portion of each heat pipe is disposed inside a hollow interior of a heat exchanger adapted to receive a flow of heated fluid therethrough.

17. The gas turbine engine of claim 12 wherein each heat pipe includes an elongated outer wall with closed ends defining a cavity that contains a working fluid.

18. The heat transfer system of claim 12 in which the strut members comprise a metallic material.

19. The heat transfer system of claim 12 wherein the strut members are constructed of an alloy of aluminum, iron, nickel, or titanium.

20. The gas turbine engine of claim 12 wherein the heat transfer system facilitates at least one of preventing ice formation on the guide vanes and removing ice which has formed on the guide vanes.

21. The gas turbine engine of claim 12 wherein the heat source is engine oil from the turbine engine, and the heat transfer system facilitates maintaining the engine oil at an acceptable working temperature.

22. A method for transferring heat in a turbine engine having an annular casing with an array of generally radially-extending guide vanes disposed therein, said method comprising:
   providing a plurality of arcuate heat pipes, at least a portion of each heat pipe being disposed against an exterior surface of the casing and within fore-and-aft limits of the axial extent of the guide vanes each of the heat pipes having an uninsulated circumferential segment disposed in thermal contact with a respective circumferential portion of an other surface of the casing, wherein the uninsulated circumferential segments do not overlap around the casing and wherein each of the arcuate heat pipes in a same circumferential direction around the casing has a different length,
   thermally coupling the heat pipes to a heat source; and receiving heat from the heat source in the heat pipes and transferring the heat to the guide vanes through the casing.

23. The method of claim 22 wherein sufficient heat is transferred to the guide vanes so as to achieve at least one of preventing ice formation on the guide vanes and removing ice which has formed on the guide vanes.

24. The method of claim 22 wherein the heat source is engine oil from the turbine engine, and sufficient heat is removed from the engine oil to maintain the engine oil at an acceptable working temperature.

* * * * *